(12) United States Patent
Selvarajan et al.

(10) Patent No.: US 12,217,613 B2
(45) Date of Patent: Feb. 4, 2025

(54) SYSTEMS AND METHODS FOR DISTRIBUTED DATA ACQUISITION

(71) Applicant: Honeywell International Inc., Morris Plains, NJ (US)

(72) Inventors: Ravikumar Selvarajan, Madurai (IN); Nayyar Rao, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 211 days.

(21) Appl. No.: 16/831,289

(22) Filed: Mar. 26, 2020

(65) Prior Publication Data

US 2021/0304620 A1    Sep. 30, 2021

(51) Int. Cl.
| H04B 7/185 | (2006.01) |
| B64D 43/00 | (2006.01) |
| G06F 12/00 | (2006.01) |
| G06F 16/2455 | (2019.01) |
| G06F 21/60 | (2013.01) |
| G08G 5/00 | (2006.01) |

(52) U.S. Cl.
CPC ............. *G08G 5/003* (2013.01); *B64D 43/00* (2013.01); *G06F 16/24564* (2019.01); *G08G 5/0013* (2013.01)

(58) Field of Classification Search
None
See application file for complete search history.

(56) References Cited

U.S. PATENT DOCUMENTS

| 8,117,213 | B1 * | 2/2012 | Nakano | G06F 16/2264 707/715 |
| 9,613,536 | B1 * | 4/2017 | Wolford | G08G 5/0026 |
| 9,712,612 | B2 | 7/2017 | Brownlow et al. | |
| 9,940,042 | B2 * | 4/2018 | Agetsuma | G06F 11/14 |
| 2009/0234856 | A1 * | 9/2009 | Miloushev | H04L 9/40 |
| 2010/0153802 | A1 | 6/2010 | Merwe et al. | |
| 2013/0030773 | A1 * | 1/2013 | O'Hare | G01B 21/04 703/1 |
| 2014/0257598 | A1 * | 9/2014 | Bailey | G05D 1/101 701/3 |

(Continued)

FOREIGN PATENT DOCUMENTS

EP    2595362 A1    5/2013

OTHER PUBLICATIONS

EP Office Action Mailed on Oct. 18, 2024 for EP Application No. 21162408, 7 page(s).

*Primary Examiner* — Adam D Tissot
*Assistant Examiner* — Michael T Silva
(74) *Attorney, Agent, or Firm* — Alston & Bird LLP

(57) ABSTRACT

Systems and methods are disclosed for acquiring data from avionics servers, flight management systems, or connected flight management system cloud services. In some embodiments, a method for acquiring data from avionics servers, flight management systems, or connected flight management system cloud services may include: receiving a dataset request from an input device; generating a plurality of sub-requests for a plurality of partial datasets from the avionics server; transmitting the plurality of sub-requests to a plurality of instances of the avionics server; generating identifications for each of the plurality of partial datasets; assembling the plurality of partial datasets into a single dataset; and transmitting the single dataset to the input device.

19 Claims, 5 Drawing Sheets

(56) References Cited

U.S. PATENT DOCUMENTS

| | | | |
|---|---|---|---|
| 2015/0261824 A1* | 9/2015 | Jha | G06F 16/1734 |
| | | | 707/690 |
| 2016/0155342 A1* | 6/2016 | Gibson | G08G 5/0078 |
| | | | 701/409 |
| 2016/0290827 A1 | 10/2016 | Cornell | |
| 2018/0047294 A1* | 2/2018 | Esposito | G08G 5/0008 |
| 2018/0091532 A1* | 3/2018 | Ueno | G06F 21/16 |
| 2018/0330624 A1* | 11/2018 | Gong | H04W 4/44 |
| 2019/0065527 A1* | 2/2019 | Shibata | G06F 11/1662 |
| 2019/0149404 A1* | 5/2019 | Toews | G08G 5/0026 |
| | | | 709/220 |
| 2019/0166172 A1* | 5/2019 | Kurian | H04L 63/145 |
| 2019/0206148 A1* | 7/2019 | Schroter | G07C 5/008 |
| 2019/0213892 A1* | 7/2019 | Schwindt | B64D 45/00 |
| 2019/0243843 A1* | 8/2019 | Kedia | G06F 16/27 |
| 2019/0362639 A1* | 11/2019 | Hosamani | G08G 5/0039 |
| 2021/0109929 A1* | 4/2021 | Sirohi | G06F 16/24535 |

* cited by examiner

SYSTEMS AND METHODS FOR DISTRIBUTED DATA ACQUISITION

TECHNICAL FIELD

Various embodiments of the present disclosure relate generally to the field of navigation and, more particularly, to systems and methods for improving the efficiency of a navigation management system by performing distributed data acquisition.

BACKGROUND

The avionics industry has been making technological advancements in enabling electronic flight bag (EFB) systems to obtain complex avionics data (e.g., flight plans) from avionics data systems (e.g., Flight Management Systems). The EFB systems can filter and convert complex avionics data into various streaming formats (e.g., JavaScript Object Notation (JSON) or Extensible Markup Language (XML)) and transmit the converted avionics data to various client applications in the EFB systems. However, some avionics data are overly complex and large in volume, creating various challenges in avionics data processing.

In general, host avionics servers reserve a large amount of storage and computational power for performing critical functionality processing. However, some legacy systems and resource constrained platforms do not have large storage for memory and processors. As such, a large amount of network bandwidth must be allocated to the legacy systems and resource constrained platforms in order to transmit and receive data with high volume. However, many legacy systems and resource constrained platforms are equipped with buses that are insufficient to support a large bandwidth for heavy data traffic, leading to unacceptably high latency in storing, processing, and forwarding data with high volume.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for improving the efficiency of navigation data management systems or Flight Management Systems through a distributed data acquisition process.

In one embodiment, a computer-implemented method is disclosed for acquiring data from an avionics server. The method comprises: receiving a dataset request from an input device; generating a plurality of sub-requests for receiving a plurality of partial datasets from the avionics server; transmitting the plurality of sub-requests to a plurality of instances of the avionics server; generating identifications for each of the plurality of partial datasets; assembling the plurality of partial datasets into a single dataset; and transmitting the single dataset to the input device.

In accordance with another embodiment, a computer system is disclosed for acquiring data of an avionics server comprising: the system comprises: a memory storing instructions, and one or more processors configured to execute the instructions to perform operations including: receiving a dataset request from an input device; generating a plurality of sub-requests for receiving a plurality of partial datasets from the avionics server; transmitting the plurality of sub-requests to a plurality of instances of the avionics server; generating identifications for each of the plurality of partial datasets; assembling the plurality of partial datasets into a single dataset; and transmitting the single dataset to the input device.

In accordance with another embodiment, a non-transitory computer-readable medium is disclosed storing instructions that, when executed by one or more processors of a computer system, cause the computer system to perform a method of acquiring data from an avionics server: receiving a dataset request from an input device; generating a plurality of sub-requests for receiving a plurality of partial datasets from the avionics server; transmitting the plurality of sub-requests to a plurality of instances of the avionics server; generating identifications for each of the plurality of partial datasets; assembling the plurality of partial datasets into a single dataset; and transmitting the single dataset to the input device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that avionics data may be retrieved efficiently from legacy and resource constrained platforms though a distributed data acquisition process.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
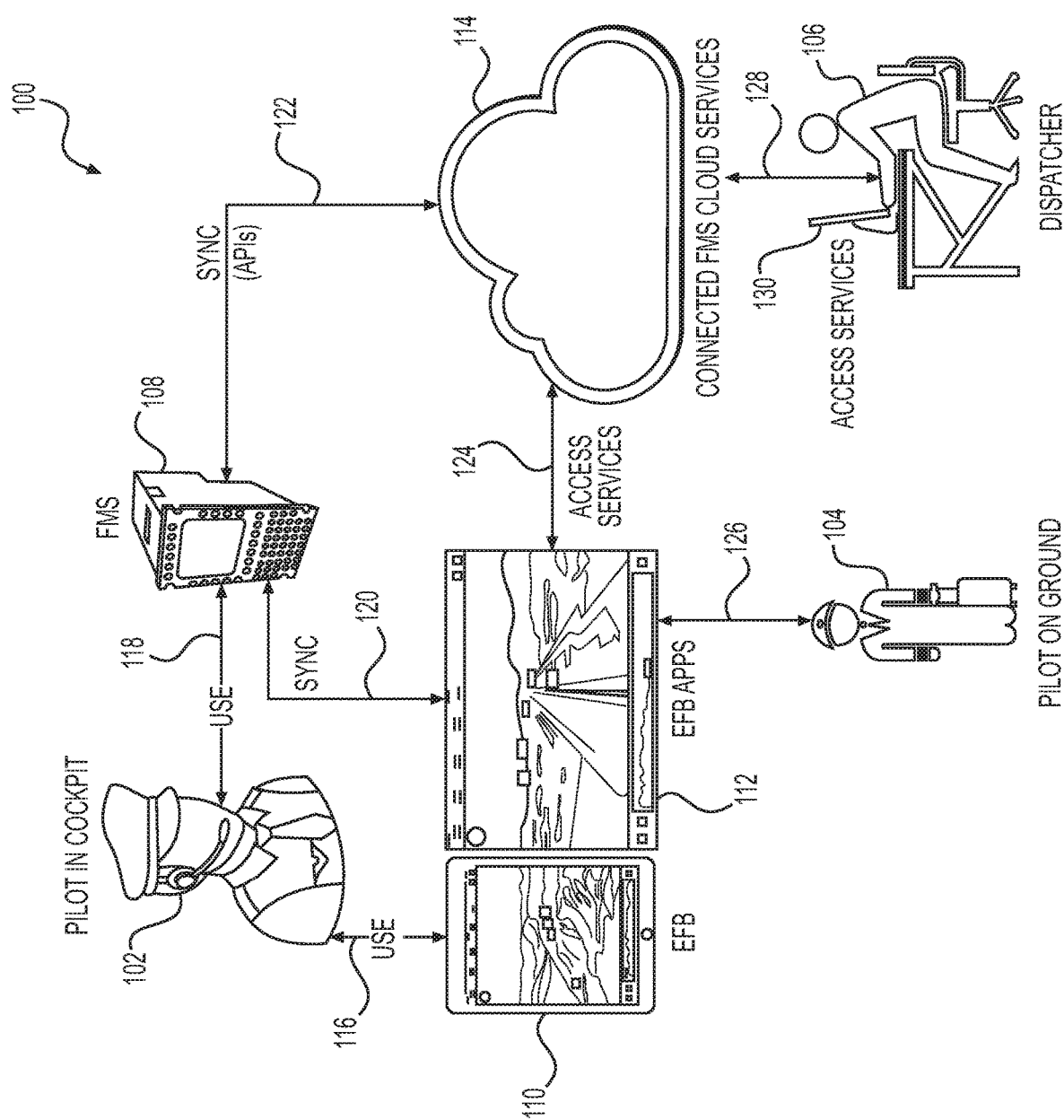
FIG. 1 depicts an overview of an example environment in which systems, methods, and other aspects of the present disclosure may be implemented.

The following embodiments describe systems and methods for improving the efficiency of navigation or flight data management with an intelligent distributed data acquisition process. As described above, transmitting and receiving data with high volume require a large amount of network bandwidth. However, existing systems may not have buses and memories that are sufficient to support a large bandwidth and storage for processing and transmitting such high volume data. As such, a need exists for intelligent and distributed data avionics processing systems that could, not only reduce latency, but also improve data reliability while minimizing constraints on avionics functioning.

Accordingly, the following embodiments describe systems and methods for providing an intelligent distributed avionics data acquisition process that may split a single data request of a complex dataset (e.g., high volume data) into multiple sub-requests of partial datasets. According to aspects of the present disclosure, an avionics server may be provided to store avionics data in multiple avionics instances that are synchronized based on redundancy management strategies. When the avionics server receives a dataset request that may, for example, require high bandwidth or cause latency, a distributed data processing component, according to aspects of the present disclosure, may intelligently calculate a data distribution ratio based on system and user parameters to split the single dataset request into sub-requests of partial datasets. As described in further detail below, providing the intelligent avionics data distribution process in accordance with the present disclosure may result in improvements in avionics data retrieval technology in various aspects. The present disclosure may allow various users to retrieve avionics data efficiently from legacy and resource constrained platforms without having to upgrade the legacy and resource constraint platforms for additional memories or processors, while reducing latency, enhancing reliability, and reserving additional processing power for critical functionality processing.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an overview of an example environment 100, according to one or more embodiments of the present disclosure. The environment 100 may, for example, include an EFB (electronic flight bag) 110, an on-board of off-board Flight Management System (FMS) 108, a connected FMS cloud services platform 114, and a dispatcher device 130. An EFB 110 may be a computer device carried by a pilot or a flight crew, which may store, for example, navigational charts, maps for air and ground operations of an aircraft, a flight plan management system, an aircraft operating manual, flight-crew operating manual, software applications which automate flight-related or avionics-related computation tasks, and/or any application or data which may be installed in a general purpose computing platform. The EFB 110 may also comprise a pilot information display (PID). The FMS 108 may be any specialized computer system or a server physically installed in an aircraft (e.g., the cockpit) or located on a computer system or a server outside of the aircraft, and may be programmed and/or customized to service the flight crew or any other client requesting for data on the FMS 108. A dispatcher device 130 may be any computer device which may be accessed by a user who performs planning, flying, navigating, or managing tasks associated with aircraft, airspaces, airports, or flight plans. Accordingly, the user is not limited to a dispatcher, and the dispatcher device 130 is not limited to a device of a dispatcher. The connected FMS cloud services platform 114 may be a cloud-based platform that provides FMS services to any user who has authorized access to the platform.

As shown in FIG. 1, the environment 100 may accommodate access by various types of users. For example, a pilot in cockpit 102 may have use access 116 to the EFB 110, use access 116 to EFB applications 112 installed in an EFB 110, and/or use access 118 to the FMS 108 for accessing the connected FMS cloud services platform 114. The EFB applications 114 may access the connected FMS cloud service platform 114, and provide the FMS services to the users of the EFB 110 in which the EFB applications 114 are installed. In that way, the EFB 110 may provide user-friendly and customized user interfaces, by which FMS services from the platform 114 may be serviced, for example, to the pilot in cockpit 102.

The FMS 108 may also be configured to synchronize data 122 with connected FMS cloud services platform 114, using, for example, an application programming interface (API). In addition, the FMS 108 may also be configured to synchronize data 120 with EFB applications 112. Thus, in some implementations, the FMS 108 may be synchronized with data from both EFB 110 and the platform 114 in real-time or at predetermined intervals, in such a way that the pilot in cockpit 102 may rely on the on-board FMS 108 for all tasks arising in the environment 100.

A pilot on ground 104 may also access the EFB 110 and the EFB applications 112. In some implementations, the pilot on ground 104 and the pilot on cockpit 102 may be the same pilot, yet under different circumstances (e.g., time and location of the access). Additionally, or alternatively, the pilot on ground 104 may be a different pilot, or another authorized member of the flight crew, who accesses EFB 110 on the ground for an official duty related to the connected FMS cloud services 114. While the pilot on ground 104 is accessing the EFB applications 112 via EFB 110, the EFB applications 112 may access the connected FMS cloud service platform 114, and receive various FMS services from it. In that way, the EFB 110 may provide user-friendly and customized user interfaces, by which FMS services 126 from the connected FMS cloud service platform 114 may be serviced to the pilot on ground 104.

A dispatcher 106 may also access the connected FMS cloud services platform 114, through a dispatcher device 130. A dispatcher, in accordance with the present disclosure, may be any authorized personnel performing duties related to dispatching of aircraft in the environment 100. For example, a dispatcher may be an airline staff, an airport staff, air traffic control personnel, a ground control personnel, a member of a relevant aviation authority, or any other authorized person who may benefit from FMS services from the connected FMS cloud services platform 114 in performing his/her duties. A dispatcher device 130 may be any computing device capable of establishing a connection 128 to the cloud and interfacing with the connected FMS cloud services platform 114. While the dispatcher 106 is accessing the FMS services via the dispatcher device 130, the dispatcher device 130 may access the connected FMS cloud service platform 114, and receive various FMS services from it. In that way, the dispatcher device 130 may provide user-friendly and customized user interfaces, by which FMS services 126 from the connected FMS cloud service platform 114 may be serviced to the dispatcher 106.

The FMS 108, the EFB 110 and the dispatcher device 130 may include one or more devices capable of receiving, generating, storing, processing, and/or providing information associated with FMS services. For example, the FMS 108, the EFB 110 or the dispatcher device 130 may include a communication and/or computing device, such as a mobile phone (e.g., a smart phone, a radiotelephone, etc.), a computer (e.g., a desktop computer, a laptop computer, a tablet computer, a handheld computer), a gaming device, a wearable communication device (e.g., a smart wristwatch, a pair of smart eyeglasses, etc.), or a similar type of device.

As indicated above, FIG. 1 is provided merely as an example. Other examples are possible and may differ from what was described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Furthermore, two or more devices shown in FIG. 1 (e.g., EFB 110 and dispatcher device 130) may be implemented within a single device, or a single device shown in FIG. 1 (e.g., EFB 110, FMS 108, or dispatcher device 130) may be implemented as multiple, distributed devices. Additionally, or alternatively, a set of devices (e.g., one or more devices) of environment 100 may perform one or more functions described as being performed by another set of devices of environment 100.

Figure 2:
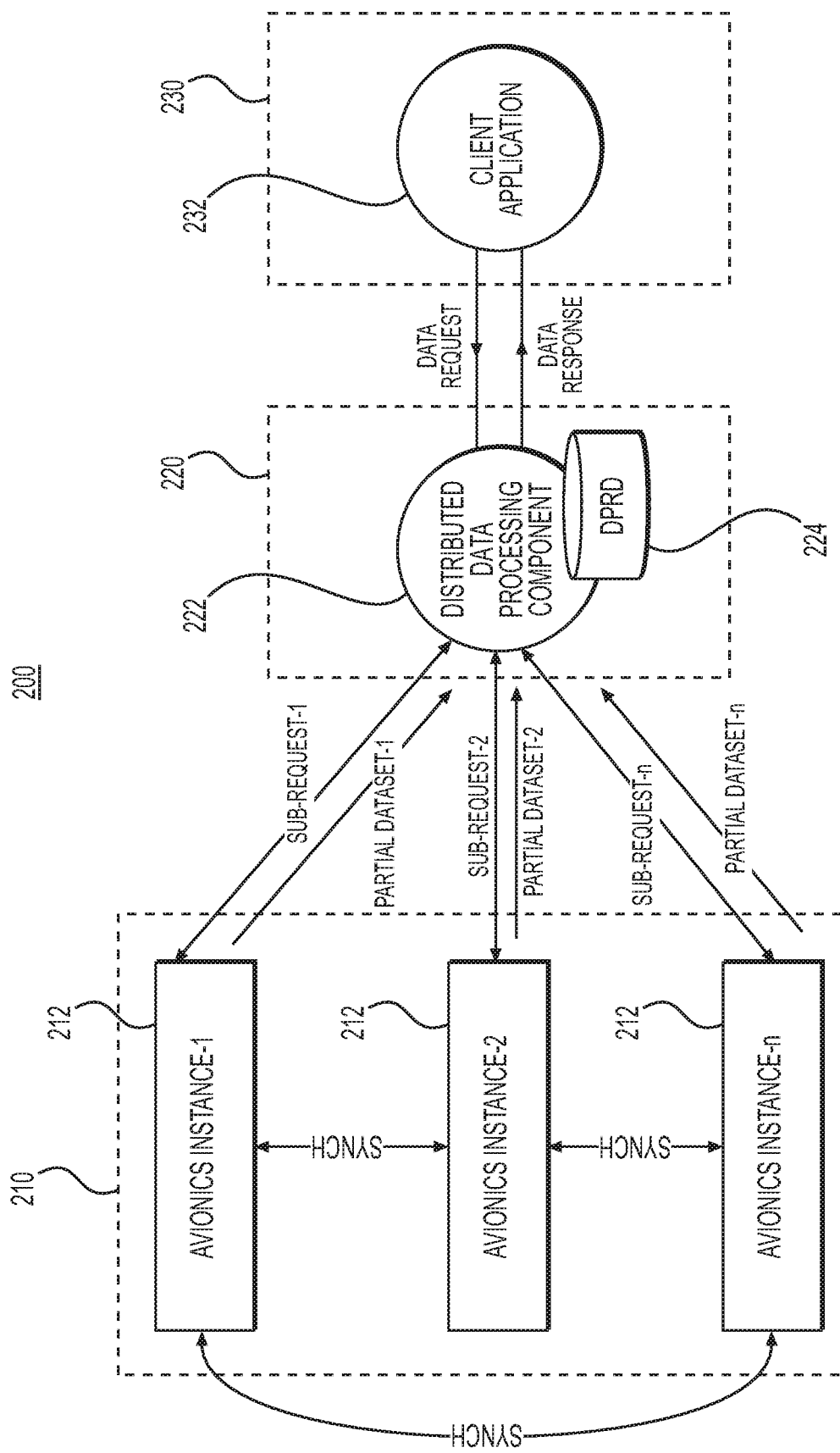
FIG. 2 depicts a block diagram schematically showing an example system for providing a distributed data acquisition process, according to one or more embodiments.

FIG. 2 depicts a block diagram schematically showing an example system 200 for providing a distributed data acquisition process, according to one or more embodiments. As shown in FIG. 2, the system 200 may include an avionics server 210, a distributed data processing module 220, and a client terminal 230. In some implementations, the system 200 may correspond to the connected FMS cloud services platform with an API gateway allowing for communications 122, 124, and 128 depicted in FIG. 1. Components, devices, and modules of the system 200 may interconnect via wired connections, wireless connections, or a combination of wired and wireless connections.

The avionics server 210 may be an FMS or maybe integrated as part of an FMS, an FMS gateway, or a connected FMS cloud services platform. The avionics server 210 may comprise multiple avionics instances 212 (e.g., a master instance, a spare instance, and a standby instance). The multiple avionics instances 212 may be synchronized with each other using redundancy management (RM) strategies (e.g., Hot Spare/Dual). In one embodiment, for example, a master instance may perform all computations and then provide the computed data to spare instances. Alternatively, for example, both the master and spare instances may independently perform computations, but may cross validate the computed data. In both examples described above, both the master and spare instances may eventually get synchronized with each other. Generally, the synchronized multiple avionics instances 212 may have identical data or datasets (e.g., navigational charts, maps for air and ground operations of an aircraft, a flight plan management system, an aircraft operating manual, flight-crew operating manual, software applications which automate flight-related or avionics-related computation tasks, and/or any application or data which may be installed in a general purpose computing platform) available for access by various users. However, the multiple avionics instances 212 may have different data or dataset (data and dataset(s) may be used interchangeably hereinafter) values momentarily. Nevertheless, the multiple avionics instances 212 may quickly synchronize to maintain identical dataset values between each other. Even if the multiple avionics instances 212 may have different dataset values momentarily, such difference may be detected and corrected by comparing unique IDs (e.g., cyclic redundancy code(s) (CRC)) of the datasets when the datasets of the multiple avionics instances 212 are received assembled for further processing by the distributed data processing module.

The distributed data processing module 220 may comprise a distributed data processing component (DDPC) 222 and a distributed processing rule database (DPRD) 224. The DDPC 222 may comprise a processor that may be a central processing unit (CPU), a graphics processing unit (GPU), or another type of processing unit. The DPRD 224 may comprise memory that may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The distributed data processing module 220 may be provided on an FMS or maybe integrated as part of an FMS, an FMS gateway, or a connected FMS cloud services platform. When the distributed data processing module 220 receives a request for a dataset (e.g., a flight plan with 255 waypoints) from a client terminal 230, the DDPC 222 may split the request into more than one sub-request and may send these sub-requests to one or more of the multiple avionics instances 212. Each of the multiple avionics instances 212 may receive its corresponding sub-request, process only the partial dataset demanded per the corresponding sub-request, and may transmit the partial dataset along with a unique ID (e.g., CRC) which may represent the entire dataset.

Figure 3:
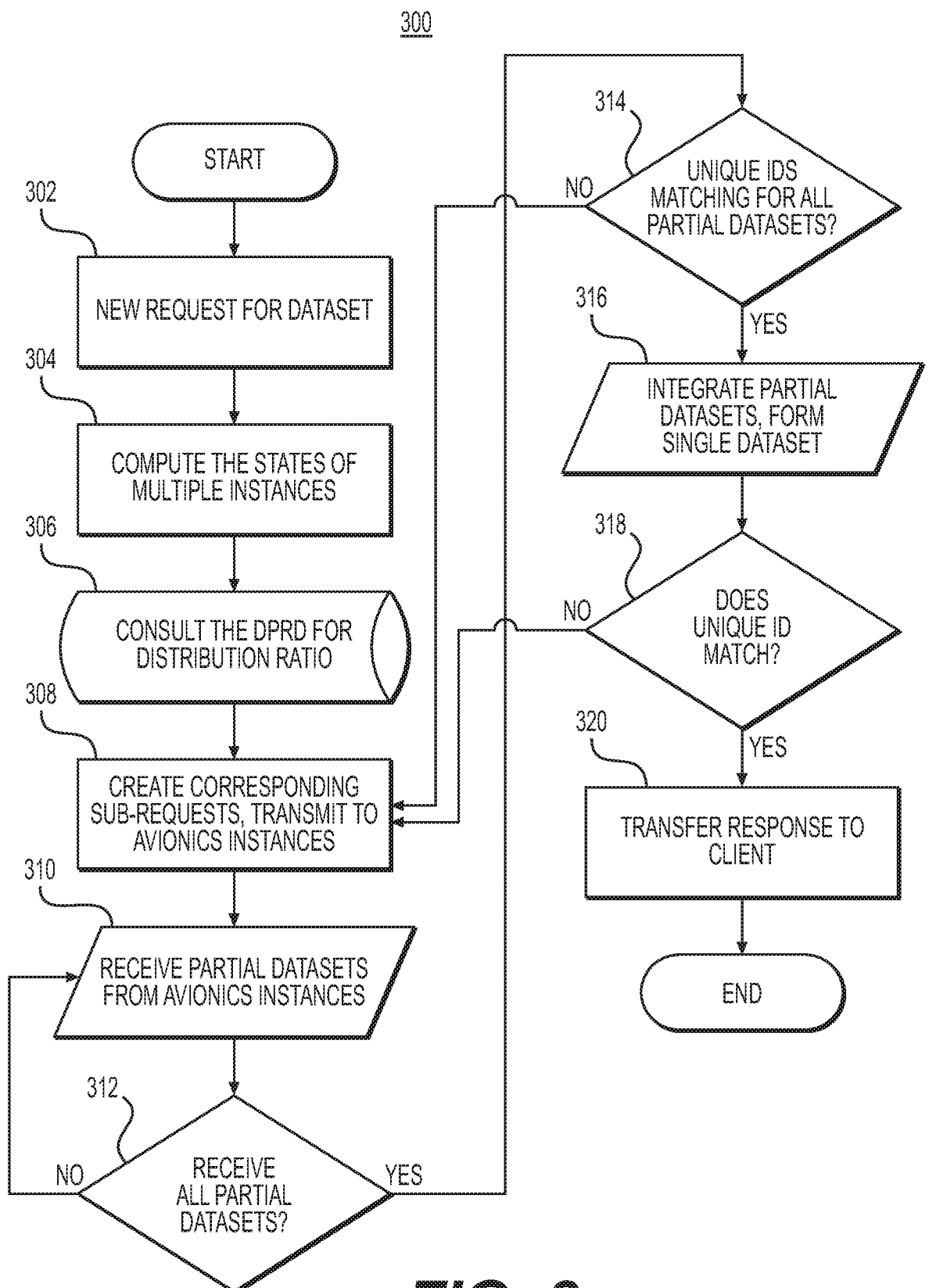
FIG. 3 depicts a flowchart illustrating an exemplary distributed data acquisition process, according to one or more embodiments

FIG. 3 shows a flowchart illustrating an exemplary process 300 for providing an intelligent distributed data acquisition, according to one or more embodiments, and an exemplary process that may be performed in the exemplary environment of FIG. 1 and the exemplary system of FIG. 2. In step 302, the DDPC 222 may receive a new request for a dataset from the client terminal 230. In step 304, the DDPC 222 may compute the states of the multiple avionics instances 212 based on the data received from the multiple avionics instances 212. The DDPC 222 may utilize an RM strategy to determine the states of the multiple avionics instances 212. That is, the DDPC 222 may determine whether the multiple avionics instances 212 are in synchronization with each other. If the multiple avionics instances 212 are in synchronization with each other, the process 300 will proceed to step 306. In some embodiments, the DDPC 222 may wait until, for a predetermined amount of time, the multiple avionics instances are in synchronization with each other. In an another embodiment, if the multiple avionics instances 212 are not synchronized, then the DDPC 222 may choose to send a full single dataset request to only a single avionics instance.

In step 306, the DDPC 222 may consult the DPRD 224 to determine a request distribution ratio, and in step 308 DDPC 222 may generate sub-requests for partial datasets based on the request distribution strategies and rules and may transmit the sub-requests to the multiple avionics instances 212. The DPRD 224 may comprise the request distribution strategies and rules that may be different for different dataset requests. The request distribution strategies and rules may be based on predetermined rules or may be based on static or dynamic parameters. For example, if the request for a dataset is for a flight plan and if the flight plan can go up to 255 waypoints, The DDPC 222 may split the request into three sub-requests (e.g., the first 100 waypoints data from a master instance, the next 100 data waypoints from a spare instance, and the remaining 55 waypoints from a standby instance). Further, the request distribution ratio may be based on data volume instead of data element counts. For example, the DDPC 222 may request a first instance for the first 100 KB of flight plan data, the next 200 KB of data from a second instance and the remaining from the third instance.

The request distribution strategies and rules may also be dynamically modified to change the way the DDPC 222 may generate sub-requests for a given avionics server with multiple avionics instances. For example, if the flight plan only has about 120 waypoints, the DDPC 222 may change the request distribution strategy and request the first 60 waypoints data from a master instance, and the next 60 waypoints from the spare instance. The DDPC 222 may also dynamically modify the request distribution strategy by adapting to any change in the parameters in the environment 100 or the system 200 and may intelligently distribute sub-requests to the multiple avionics instances 212. For example, if a master instance becomes overwhelmed with data requests during a final approach segment of a flight, the request distribution ratio may be dynamically adjusted to request more datasets from spare/standby instances than previously established, in order to reduce or avoid data requests from the master instance. The parameters in the environment 100 or the system 200 may be based on, for example, any factors relating to the redundancy management states of the multiple avionics instances 212 of the avionics server 210, workloads of the multiple avionics instances 212, phases of flights, volume of a dataset, navigational charts, maps for air and ground operations of an aircraft, a flight plan management system, an aircraft operating manual, flight-crew operating manual, software applications which automate flight-related or avionics-related computation tasks, and/or any application or data which may be installed in a general purpose computing platform. The parameters in the environment 100 or the system 200 may also be based on, for example, any factors (e.g., priority or location) relating to a dispatcher that may be an airline staff, an airport staff, air traffic control personnel, a ground control personnel, a member of a relevant aviation authority, or any other authorized person who may benefit from FMS services from the connected FMS cloud services platform 114 in performing his/her duties.

In step 310, the DDPC 222 may receive the partial datasets with unique IDs (e.g., CRCs) based on the sub-requests from the multiple avionics instances 212. In step 312, if the DDPC 222 does not receive all of the partial datasets, the DDPC 222 may wait for a predetermined amount of time to receive all of the partial datasets from the multiple avionics instances 212. However, if the DDPC 222 determines that all of the partial datasets have been received from each of the multiple avionics instances 212, the DDPC 222 may then verify whether the unique IDs of each of the partial datasets match with each other in step 314. For example, if the request for the dataset is for a flight plan and if the flight plan can go up to 255 waypoints, the DDPC 222 may split the request into three sub-requests (e.g., the first 100 waypoints data from a master instance, the next 100 data waypoints from a spare instance, and the remaining 55 waypoints from a standby instance). The master instance may send the partial dataset with the first 100 waypoint data, the spare instance may send the partial dataset with the second 100 waypoint data, and the standby instance may send the partial dataset with the last remaining 55 waypoints data. Each of the received partial datasets may carry the same unique ID calculated for the whole of the 255-waypoint flight plan dataset. The DDPC 222 may first cross-check all of the unique IDs received from each of the multiple avionics instances, and if all of the unique IDs are identical, then the DDPC 222 may assemble a single 255-waypoint flight plan dataset in step 316. If the unique IDs do not match with each of the received partial datasets, then the process 300 may go back to step 308 to re-generate the sub-requests for the corresponding partial datasets.

In step 318, the DDPC 222 may calculate a unique ID (e.g., CRC) on the single 255-waypoint flight plan dataset assembled from the partial datasets received from the multiple avionics instances 212. If this unique ID still matches with the unique IDs received from the multiple avionics instances 212, the DDPC 222 may then determine that it has received a good dataset response. However, if the unique ID for the assembled single dataset does not match with the unique IDs of all of the partial datasets, then the DDPC 222 may go back to step 308 to re-generate the sub-requests for the corresponding partial datasets.

In step 320, the system may transmit the requested single dataset to the client terminal 230 in step 320. The client terminal 230 may comprise a dispatcher device 130 or and EFB 110 as described in FIG. 1, or any other device that may request datasets in the FMS 108, avionics server 210, the connected FMS cloud services 114, or any other storage device that comprises avionics data. The client terminal 230 may comprise a client application(s) 232 that may be provided to request datasets from the FMS 108, avionics server 210, the connected FMS cloud services 114, or any other storage device that comprises avionics data.

Figure 4:
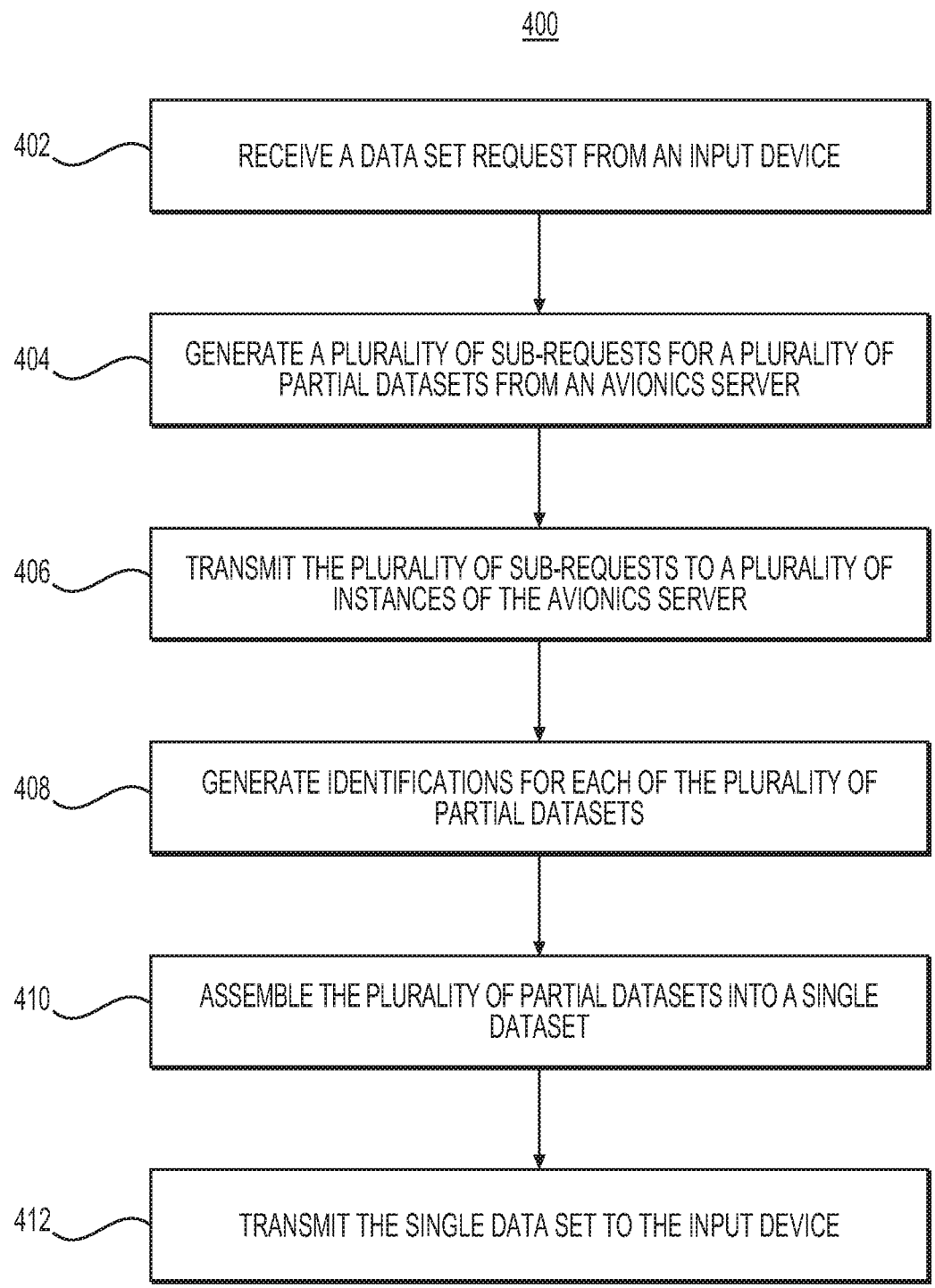
FIG. 4 depicts a flowchart of an exemplary method for performing a distributed avionics data acquisition process, according to one aspect of the present disclosure.

FIG. 4 depicts a flowchart of an exemplary method for performing a distributed avionics data acquisition process, according to one aspect of the present disclosure. In particular, method 400 may be performed by the system 300.

In step 402, the distributed data processing module 220 may receive a data set request from an input device (e.g., the client terminal 230).

In step 404, the DDPC 222 may generate a plurality of sub-requests for a plurality of partial datasets. In an exemplary embodiment, the DDPC 222 may determine, before step 404, whether the plurality of instances 212 of the avionics server 210 is in synchronization with each other. The plurality of instances 212 of the avionics server 210 may be synchronized with each other based on a redundancy management strategy, and upon determining the plurality of instances 212 of the avionics server 210 is not in synchronization with each other, the DDPC 222 may transmit a single dataset request to one of the plurality of instances 212 of the avionics server 210. However, upon determining the plurality of instances of the avionics server is in synchronization with each other, the DDPC may proceed to step 404.

In another exemplary embodiment, the DDPC 222 may determine, in step 404, how many of the plurality of sub-requests to transmit based on a request distribution ratio received from the DPRD 224. The DDPC 222 may transmit the determined number of the plurality of sub-requests to corresponding plurality of instances 212 of the avionics server 210. Further, the DDPC 222 may dynamically generate a new request distribution ratio based on at least one of avionics data parameters and user parameters. For example, the avionics data parameters and user parameters may comprise at least one of a type of data, a volume of data, redundancy management states, phases of flights, a user location, and workloads of the plurality of instances of the avionics server. The DDPC 222 may then update the rule database with the new request distribution ratio.

In step 406, the DDPC 222 may transmit the plurality of sub-requests to the plurality of instances 212 of the avionics server 210. In step 408, the DDPC 222 may generate identifications for each of the plurality of partial datasets. In an exemplary embodiment, the plurality of instances 212 of the avionics server 210 may transmit the plurality of partial datasets along with the identifications to the DDPC 222, and the DDPC 222 may determine whether the identifications of said each of the plurality of partial datasets are identical. Upon determining the identifications are not identical, the DDPC 222 may re-generate the plurality of sub-requests to the plurality of instances of the avionics server. However, upon determining the identifications are identical, the DDPC 222 may proceed to step 410.

In step 410, the DDPC 222 may assemble the plurality of partial data sets into a single dataset. In an exemplary embodiment, the DDPC 222 may generate another identification for the assembled single dataset and compare said another identification to the identifications of said each of the plurality of partial datasets. Upon determining said another identification and the identifications are identical, the DDPC 222 may proceed to step 412. However, upon determining said another identification and the identification are not identical, the DDPC 222 may re-generate the plurality of sub-requests and transmit the plurality of sub-requests to the plurality of instances 212 of avionics server 220.

In step 412, the distributed data acquisition module 220 may then transmit the single dataset to the input device (e.g., client terminal 230).

In general, any process discussed in this disclosure that is understood to be computer-implementable, such as the process shown in FIG. 2 and the processes described in connection with FIG. 4, may be performed by one or more processors of a computer system, such as the system 300, the EFB 110, and/or the dispatcher device 130, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as EFB 110, the avionics server 210, the distributed data processing module 220, the client terminal 230, and/or client device 150, may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
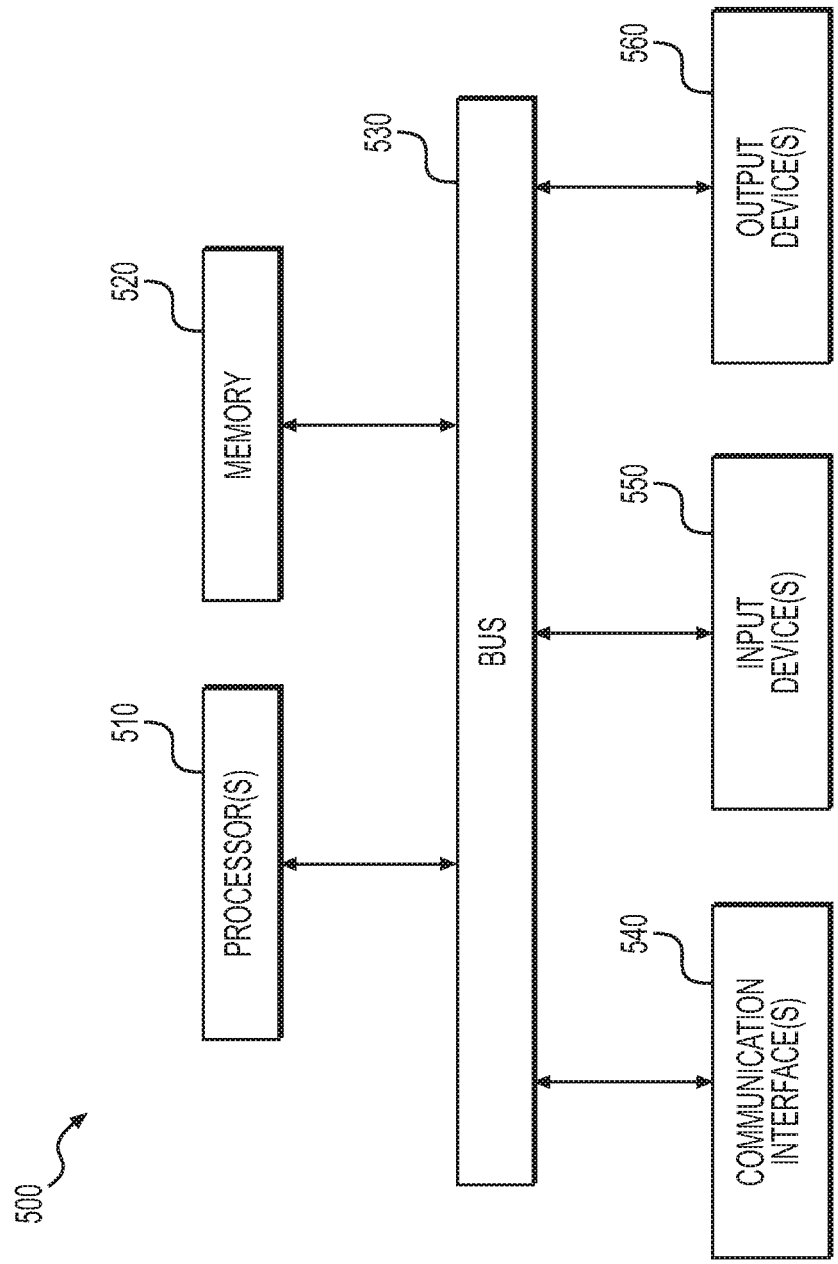
FIG. 5 depicts a computer system according to one or more embodiments.

FIG. 5 illustrates an example of a computing device 500 of a computer system. The computing device 500 may include processor(s) 510 (e.g., CPU, GPU, or other processing unit), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). For example, if the EFB 110 is embodied as a tablet computer, as shown in FIG. 1, the EFB may have a touchscreen and a display. The aforementioned elements of the computing device 500 may be connected to one another through a bus 530, which represents one or more busses. In some embodiments, the processor(s) 510 of the computing device 500 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method.

Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for acquiring data from an avionics server, the method comprising:
   receiving, from an input device, a request for a dataset, wherein the request for the dataset is for a flight plan that includes a plurality of waypoints;
   generating a plurality of sub-requests for receiving, from the avionics server, a corresponding plurality of partial datasets of the dataset that includes the plurality of waypoints;
   transmitting the plurality of sub-requests to a corresponding plurality of instances of the avionics server, wherein each instance of the plurality of instances includes the dataset;
   generating a cyclic redundancy code (CRC) for each of the plurality of partial datasets, wherein each CRC is generated based on the whole of the dataset such that each CRC is defined by a first code value;
   receiving the plurality of partial datasets based on the plurality of sub-requests to the plurality of instances of the avionics server, wherein each of the received plurality of partial datasets carries the same CRC defined by the first code value generated based on the whole of the dataset;
   determining that all of the plurality of partial datasets have been received from each of the plurality of instances of the avionics server;
   cross-checking the CRCs for each of the plurality of partial datasets and determining that the CRCs of each of the plurality of partial datasets are identical to each other to identify that each of the CRCs is defined by the first code value generated based on the whole of the dataset;
   assembling the plurality of partial datasets into a single dataset in response to the determining that the CRCs of each of the plurality of partial datasets are identical;
   generating a CRC of the assembled single dataset based on the whole of the assembled single dataset, wherein the CRC of the assembled single dataset is defined by a second code value generated based on the whole of the assembled single dataset;
   cross-checking the CRC of the assembled single dataset with the CRCs for each of the plurality of partial datasets by determining that the CRC of the assembled single dataset and the CRCs for each of the plurality of partial datasets are identical to each other to identify that the first code value generated based on the whole of the dataset is the same as the second code value generated based on the whole of the assembled single dataset; and
   based on the cross-checking the CRC of the assembled single dataset, transmitting the assembled single dataset to the input device.

2. The method of claim 1, further comprising:
   determining that the plurality of instances of the avionics server is in synchronization with each other; and
   in response to the determination that the plurality of instances of the avionics server is in synchronization with each other, transmitting the plurality of sub-requests to the plurality of instances of the avionics server.

3. The method of claim 1, further comprising:
   in response to the determination that the CRCs of each of the plurality of partial datasets are identical to each other, assembling the plurality of partial datasets into the single dataset.

4. The method of claim 1, further comprising:
   receiving a distribution ratio from a rule database;
   determining a number of the plurality of sub-requests to transmit based on the distribution ratio in the rule database; and
   transmitting the number of the plurality of sub-requests to the plurality of instances of the avionics server.

5. The method of claim 4, further comprising:
   dynamically generating a new distribution ratio based on at least one of avionics data parameters and user parameters; and
   updating the rule database with the new distribution ratio.

6. The method of claim 4, wherein the distribution ratio is based on at least one of a type of data, a volume of data, redundancy management states, phases of flights, a user location, and workloads of the plurality of instances of the avionics server.

7. The method of claim 1, wherein the plurality of instances of the avionics server is synchronized with each other based on a redundancy management strategy.

8. A computer system for acquiring data of an avionics server comprising:
a memory storing instructions; and
one or more processors configured to execute the instructions to perform operations including:
receiving, from an input device, a request for a dataset, wherein the request for the dataset is for a flight plan that includes a plurality of waypoints;
generating a plurality of sub-requests for receiving, from the avionics server, a corresponding plurality of partial datasets of the dataset that includes the plurality of waypoints;
transmitting the plurality of sub-requests to a corresponding plurality of instances of the avionics server, wherein each instance of the plurality of instances includes the dataset;
generating a cyclic redundancy code (CRC) for each of the plurality of partial datasets, wherein each CRC is generated based on the whole of the dataset such that each CRC is defined by a first code value;
receiving the plurality of partial datasets based on the plurality of sub-requests to the plurality of instances of the avionics server, wherein each of the received plurality of partial datasets carries the same CRC defined by the first code value generated based on the whole of the dataset;
determining that all of the plurality of partial datasets have been received from each of the plurality of instances of the avionics server;
cross-checking the CRCs for each of the plurality of partial datasets by determining whether the CRCs of each of the plurality of partial datasets are identical to each other to identify that each of the CRCs is defined by the first code value generated based on the whole of the dataset;
based on the cross-checking the CRCs for each of the plurality of partial datasets and upon determining whether each of the CRCs of plurality of partial datasets are identical, assembling the plurality of partial datasets into a single dataset;
generating a CRC of the assembled single dataset based on the whole of the assembled single dataset, wherein the CRC of the assembled single dataset is defined by a second code value generated based on the whole of the assembled single dataset;
cross-checking the CRC of the assembled single dataset with the CRCs for each of the plurality of partial datasets by determining whether the CRC of the assembled single dataset and the CRCs for each of the plurality of partial datasets are identical to each other to identify that the first code value generated based on the whole of the dataset is the same as the second code value generated based on the whole of the assembled single dataset; and
based on the cross-checking the CRC of the assembled single dataset, transmitting the assembled single dataset to the input device.

9. The system of claim 8, wherein the one or more processor configured to execute the instructions to perform operations further including:

determining whether the plurality of instances of the avionics server is in synchronization with each other;
upon determining the plurality of instances of the avionics server is in synchronization with each other, transmitting the plurality of sub-requests to the plurality of instances of the avionics server; and
upon determining the plurality of instances of the avionics server is not in synchronization with each other, transmitting a single dataset request to one of the plurality of instances of the avionics server.

10. The system of claim 8, wherein the one or more processor configured to execute the instructions to perform operations further including:
receiving a distribution ratio from a rule database;
determining a number of the plurality of sub-requests to transmit based on the distribution ratio in the rule database; and
transmitting the number of the plurality of sub-requests to the plurality of instances of the avionics server.

11. The system of claim 10, wherein the one or more processor configured to execute the instructions to perform operations further including:
dynamically generating a new distribution ratio based on at least one of avionics data parameters and user parameters; and
updating the rule database with the new distribution ratio.

12. The system of claim 10, wherein the distribution ratio is based on at least one of a type of data, a volume of data, redundancy management states, phases of flights, a user location, and workloads of the plurality of instances of the avionics server.

13. The system of claim 8, wherein the input device is an electronic flight bag or a pilot information display.

14. The system of claim 8, wherein the avionics server may be provided on a flight management system or a connected flight management system service.

15. The system of claim 8, wherein the plurality of instances of the avionics server comprises at least one of a master instance, a spare instance, and a standby instance.

16. A non-transitory computer-readable medium storing instructions that, when executed by one or more processors of a computer system, cause the computer system to perform a method of acquiring data from an avionics server, the method comprising:
receiving, from an input device, a request for a dataset, wherein the request for the dataset is for a flight plan that includes a plurality of waypoints;
generating a plurality of sub-requests for receiving, from the avionics server, a corresponding plurality of partial datasets of the dataset that includes the plurality of waypoints;
transmitting the plurality of sub-requests to a corresponding plurality of instances of the avionics server, wherein each instance of the plurality of instances includes the dataset;
generating a cyclic redundancy code (CRC) for each of the plurality of partial datasets, wherein each CRC is generated based on the whole of the dataset such that each CRC is defined by a first code value;
receiving the plurality of partial datasets based on the plurality of sub-requests to the plurality of instances of the avionics server, wherein each of the received plurality of partial datasets carries the same CRC defined by the first code value generated based on the whole of the dataset;

determining that all of the plurality of partial datasets have been received from each of the plurality of instances of the avionics server;

cross-checking the CRCs for each of the plurality of partial datasets by determining whether the CRCs of each of the plurality of partial datasets are identical to each other to identify that each of the CRCs is defined by the first code value generated based on the whole of the dataset;

based on the cross-checking the CRCs for each of the plurality of partial datasets and upon determining whether each of the CRCs of plurality of partial datasets are identical, assembling the plurality of partial datasets into a single dataset;

generating a CRC of the assembled single dataset based on the whole of the assembled single dataset, wherein the CRC of the assembled single dataset is defined by a second code value generated based on the whole of the assembled single dataset;

cross-checking the CRC of the assembled single dataset with the CRCs for each of the plurality of partial datasets by determining whether the CRC of the assembled single dataset and the CRCs for each of the plurality of partial datasets are identical to each other to identify that the first code value generated based on the whole of the dataset is the same as the second code value generated based on the whole of the assembled single dataset; and based on the cross-checking the CRC of the assembled single dataset, transmitting the assembled single dataset to the input device.

17. The non-transitory computer-readable medium of claim 16, wherein the method further comprises:
determining whether the plurality of instances of the avionics server is in synchronization with each other;
upon determining the plurality of instances of the avionics server is in synchronization with each other, transmitting the plurality of sub-requests to the plurality of instances of the avionics server; and
upon determining the plurality of instances of the avionics server is not in synchronization with each other, transmitting a single dataset request to one of the plurality of instances of the avionics server.

18. The non-transitory computer-readable medium of claim 16, wherein the method further comprises:
receiving a distribution ratio from a rule database;
determining a number of the plurality of sub-requests to transmit based on the distribution ratio in the rule database; and
transmitting the number of the plurality of sub-requests to the plurality of instances of the avionics server.

19. The non-transitory computer-readable medium of claim 18, wherein the method further comprises:
dynamically generating a new distribution ratio based on at least one of avionics data parameters and user parameters; and
updating the rule database with the new distribution ratio.

* * * * *